United States Patent Office 2,940,904
Patented June 14, 1960

2,940,904

ENZYMATIC PROCESS

Donald W. Ohlmeyer, Glenview, Ill., assignor to Ben L. Sarett, Chicago, Ill.

No Drawing. Filed Apr. 24, 1957, Ser. No. 654,677

8 Claims. (Cl. 195—66)

This invention relates to an enzymatic process and has for an object the provision of a process for removing proteolytic enzymes from a glucose oxidase-containing enzyme system.

Glucose oxidase is a well known enzyme which may be prepared by known methods from the mycelia of various microorganisms, such as molds of the genus Aspergillus and Penicilium. One procedure for producing glucose oxidase is disclosed in Dwight L. Baker Reissue Patent No. 23,523, dated July 22, 1952. As pointed out in the Baker reissue patent and as pointed out in Robert R. Baldwin Patent No. 2,744,017, dated May 1, 1956, the enzyme glucose oxidase has found many practical applications particularly in connection with the deoxygenation or desugarizing of certain foods and food products. In accordance with certain of the procedures utilizing the glucose oxidase enzyme system, the glucose oxidase (usually containing catalase) is dispersed directly within the product to be treated, thereby providing means for the direct removal of oxygen or sugar as the case may be from the medium within which it is dispersed.

Commercial preparations of glucose oxidase usually contain the enzyme catalase and have also been found in many instances to contain substantial amounts of proteolytic enzymes. In many types of food treatment such proteolytic enzymes are not objectionable, particularly when the product contains no substantial quantities of proteinaceous material or where the product is dried shortly after treatment. However, there are certain protein-containing food products which are susceptible to treatment with glucose oxidase for known purposes but which may be adversely affected by the proteolytic enzymes which may be found as impurities in commercial glucose oxidase enzyme preparations under conditions wherein the food products contain water and are stored in the presence of water for long periods of time in which the proteolytic enzymes are given time to act. For example, it has been found in certain instances that if glucose oxidase is used in the treatment of milk products any proteolytic enzyme that may be present as an impurity in the glucose oxidase may serve upon storage in the presence of water to convert the casein to paracasein whereby the aqueous milk product will be coagulated or have an undesired tendency to coagulate. Furthermore, if the enzyme system is used in connection with the treatment of products containing substantial amounts of proteinaceous materials, any proteolytic enzyme that may be introduced by way of the glucose oxidase enzyme preparation may have a tendency upon storage of the product in the presence of water to degrade the structure of the protein. Thus gelatin products will be adversely affected in that the gelatin will not gel properly and the product thus treated is unsuitable for ready customer acceptance.

Accordingly, a further object of this invention is the provision of a method for separating or removing proteolytic enzymes that may be present in commercial glucose oxidase preparations.

A still further object of this invention is the provision of a method of removing proteolytic enzymes from glucose oxidase preparations without substantially reducing the potency of the glucose oxidase contained therein and without materially affecting the potency of the catalase that may also be present in such preparations.

A still further object of this invention is the provision of a process for readily preparing a glucose oxidase composition which may contain catalase but which is essentially free from proteolytic enzymes.

Further and additional objects will appear from the following description and accompanying claims.

In accordance with one embodiment of this invention, it has been found that proteolytic enzymes may be removed from an enzyme preparation containing glucose oxidase by heating an aqueous solution or dispersion of the enzyme preparation under controlled conditions whereby the proteolytic enzyme is preferentially deactivated without substantially affecting the activity of the glucose oxidase or of any catalase that may be associated therewith. The invention is primarly applicable to concentrated aqueous dispersions of the glucose oxidase-containing enzyme system and is more particularly applicable to dispersions which have a concentration of glucose oxidase in excess of about 200 units per gram. A unit of glucose oxidase is herein intended to mean the unit essentially as defined in Dwight L. Baker Patent No. 2,651,592, dated September 8, 1953. The concentrated glucose oxidase dispersions may include any of those that are presently commercially available. Certain of these are available in the aqueous solution state. Others are in the form of dry powders which may be dispersed in water prior to treatment in accordance with this invention. The temperatures useful for preferentially removing the proteolytic enzymes is between about 50° and 80° C. Below 50° C. the proteolytic enzyme is not inactivated in any reasonable period of time and above about 80° C. (particularly above about 87° C.) the glucose oxidase itself is rapidly destroyed. In commercial operations it is preferable to operate at temperatures between about 55° and 65° C. The time during which the heating is carried out may vary widely depending upon the concentration of the enzyme, the temperatures employed and the hydrogen-ion concentration. Broadly speaking, the time of treatment may vary between about 5 minutes and 10 hours, a shorter period of time being applicable when using the higher temperatures. For most practical operations, however, the time of heating is usually between about 15 minutes and 2 hours. With respect to the hydrogen-ion concentration, it is usually preferred to operate between pH 5 and 7. The pH range which represents the broadest range in which the process may be carried out is usually in the area of pH 4 to 8.

After the aqueous dispersion of the enzyme system has been heated under the conditions above indicated, the proteolytic enzyme will be inactivated and will usually form as a precipitate. This precipitate may be removed by settling, filtering or centrifuging and the resulting glucose oxidase solution, the normal catalase content thereof being substantially unimpaired, can be used in the usual manner to treat food or other products as is well known.

For a more complete understanding of this invention, reference will now be made to the following examples showing specific methods for removing proteolytic enzymes from glucose oxidase preparations.

*Example 1*

A commercially available glucose oxidase preparation containing catalase and proteolytic enzymes in the form of a clear amber aqueous solution containing about 750 units of glucose oxidase per milliliter was heated to about 60° C. for 30 minutes. A precipitate formed which was separated by filtration. The resulting solution was essentially free of proteolytic enzyme but still had a glucose oxidase activity of 725 units per milliliter. Thus the glucose oxidase activity was reduced only about 3 percent. The thus treated glucose oxidase enzyme also contained catalase in substantially undiminished amounts. It is suitable for use in the treatment of various types of protein-containing products for desugarizing or deoxygenating as is well known.

*Example 2*

A commercially available glucose oxidase preparation in the form of a solution or dispersion containing about 3000 units of glucose oxidase per milliliter as well as catalase and a proteolytic enzyme was heated at 60° C. for one hour. The solids were then separated by filtration and the resulting solution contained glucose oxidase and catalase from which the proteolytic enzyme had been removed. In this instance the activity of the glucose oxidase was reduced only about 8 percent on account of the heating although all of the proteolytic activity had been removed. The treated enzyme system is useful for treating food or other products which would normally be adversely affected by the presence of a proteolytic enzyme.

In order to demonstrate the effectiveness of the herein disclosed procedure in removing proteolytic enzyme from commercial glucose oxidase preparations, a gelatin solution was prepared by dissolving 10 grams of gelatin in 500 milliliters of warm water. The solution was divided into three portions of 130 milliliters each. While still warm 20 milliliters of glucose oxidase treated in accordance with Example 1 were added to a first portion, 20 milliliters of the glucose oxidase indicated in Example 1 but which was not treated were added to a second portion, and 20 milliliters of water were added to a third portion. The resulting three mixtures were allowed to stand at room temperatures for one hour and then placed in a refrigerator at 40° F. After six days it was noted that the first and third portions above noted were in the form of a rigid gel while the second portion did not gel and was soft and watery. This is proof that the untreated portion of glucose oxidase contained a proteolytic enzyme which was removed by the treatment herein disclosed.

A similar experiment was carried out utilizing a commercial Jello solution with essentially the same results. A further test was carried out involving a coagulation test with a milk protein. In this latter instance the untreated enzyme exhibited a tendency to coagulate the milk protein while the treated glucose oxidase enzyme preparation had no such effect.

The glucose oxidase product treated in accordance with the process of this invention remains substantially unimpaired with respect to its glucose oxidase and catalase content and it is particularly useful in the treatment of protein-containing substances to remove oxygen or glucose therefrom in accordance with the procedures set forth in Baker Reissue Patent No. 23,523 and Baldwin Patent No. 2,744,017. The amounts of the glucose oxidase product employed in each instance will depend upon the usual time, temperature and concentration factors, as is well known and as disclosed in said patents. The product, being free of proteolytic enzyme, will not adversely affect a protein-containing substance treated with it even though that substance be stored over long periods of time in the presence of water. Thus the protein does not degrade or otherwise change due to proteolytic enzyme activity.

While a particular embodiment of this invention is shown above, it will be understood of course, that the invention is not to be limited thereto, since many modifications may be made, and it is contemplated, therefore, by the appended claims, to cover any such modifications as fall within the true spirit and scope of this invention.

I claim:

1. A process for removing proteolytic enzymes from a glucose oxidase enzyme system containing the same which comprises the steps of heating an aqueous dispersion of said enzyme system having a pH between about 4 and about 8 to a temperature between about 50° and 80° C. for a period of time sufficient to inactivate a substantial portion of said proteolytic enzyme.

2. The process recited in claim 1 in which said enzyme system is heated for between about 5 minutes and 10 hours.

3. A process of removing proteolytic enzyme impurities from an enzyme system containing same and containing glucose oxidase in a concentration in excess of about 200 units per milliliter which includes the steps of heating an aqueous dispersion of said enzyme system to a temperature between about 50° and about 80° C. for a period of time between about 5 minutes and 10 hours and at a pH between about 4 and about 8 whereby to precipitate the proteolytic enzymes, and thereafter separating the precipitate from the solution containing glucose oxidase.

4. The process recited in claim 3 in which said temperature is between about 55° and 65° C.

5. The process recited in claim 4 in which said time is between about 15 minutes and 2 hours.

6. The process recited in claim 4 in which the pH is between about 5 and 7.

7. A process for improving a glucose oxidase-containing enzyme system which comprises the steps of heating an aqueous solution of said enzyme system containing in excess of 200 units of glucose oxidase per milliliter and having a pH between about 4 and about 8 to a temperature between about 50° and 80° C. for a period of time sufficient to form a precipitate but insufficient to destroy a substantial amount of the glucose oxidase present.

8. The process recited in claim 7 wherein said precipitate is separated from the treated solution.

References Cited in the file of this patent

UNITED STATES PATENTS 2,683,682    Miller et al. _____ July 13, 1954

OTHER REFERENCES

Chemistry and Technology of Enzymes by Tauber, 1949, pub. by John Wiley and Sons, Inc. (New York), page 64.

The Enzymes, Sumner and Myrback, vol. II, part 1, 1951, page 764.

Advances in Enzymology, vol. 14, 1953, pages 396 to 397.

Chemistry and Methods of Enzymes by Sumner et al., 1953, pub. by Academic Press Inc. (New York), page 18.